Jan. 10, 1933.         C. O. McCORD         1,894,186
                       WINDSHIELD WIPER
                       Filed May 18, 1931
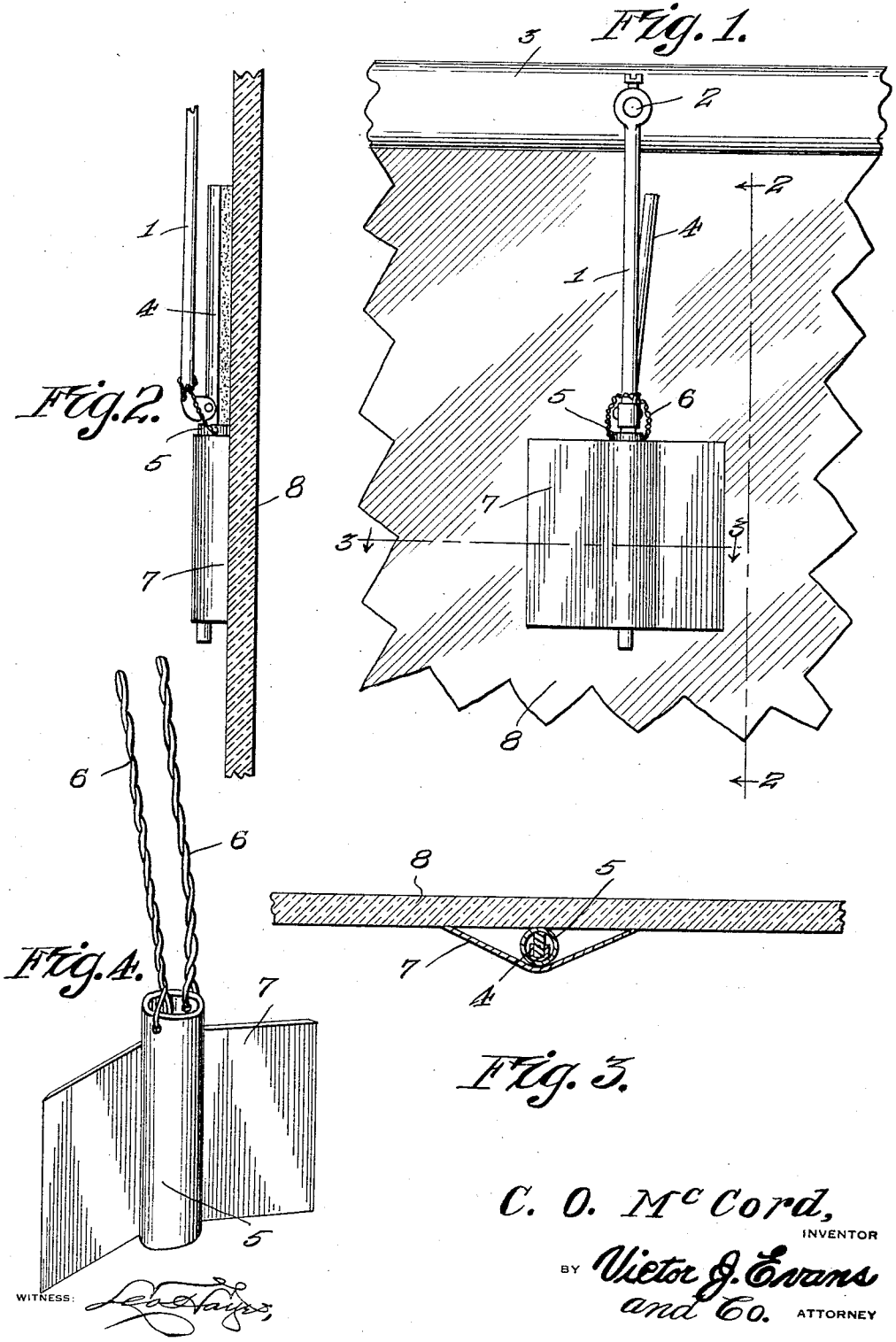
C. O. McCord,
INVENTOR
BY Victor J. Evans
and Co. ATTORNEY
WITNESS:

Patented Jan. 10, 1933

1,894,186

UNITED STATES PATENT OFFICE

CLARENCE O. McCORD, OF CRESCO, IOWA

WINDSHIELD WIPER

Application filed May 18, 1931. Serial No. 538,294.

This invention relates to a windshield wiper especially adapted to be used upon an automobile machine or flying machine and it consists in the novel features hereinafter described and claimed.

An object of the invention is to provide a wiper of the character stated which is of simple and durable structure and which may be easily and quickly applied to the windshield and adapted to operate at the outer side thereof to prevent the accumulation of moisture or ice upon the exterior surface of the windshield.

With this object in view the structure includes an arm which hangs pendant from the upper rail of the frame of the windshield and which carries at its lower end a wiper of usual pattern. The present invention includes a cylinder adapted to slide upon the lower end portion of the wiper and having wing portions extending beyond its opposite side. As the arm swings across the windshield the wing portions engage the particles of ice which may have formed at the exterior surface of the shield and the cylinder together with the wiper remove the particles from the windshield after they have been cut loose by the wing.

In the accompanying drawing:—

Figure 1 is a side elevational view of the windshield applied.

Figure 2 is a detailed sectional view cut on the line 2—2 of Figure 1.

Figure 3 is a similar view cut on the line 3—3 of Figure 1.

Figure 4 is a perspective view of the windshield worker attachment.

As illustrated in the accompanying drawing the windshield wiper comprises an arm 1 which is pivoted at 2 to the upper rail 3 of the windshield in a usual manner. The arm 1 carries at its lower end a wiper 4. The attachment includes a cylinder 5 which is adapted to be slipped over the lower end portion of the brush 4 and flexible wires 6 are connected with the upper end of the cylinder and are adapted to be connected with the arm 1 as best shown in Figures 1 and 2 of the drawing and whereby the cylinder 5 is prevented from slipping from the lower end portion of the brush. A plate of metal 7 is provided with angularly disposed side portions and the said plate is attached to the side of the cylinder 5. The arrangement is such that the vertical edges of the plate 7 lie against the outer surface of the sheet of glass 8 which forms a portion of the windshield.

The operation of the device is as follows:—
As the arm 1 swings across the sheet of glass the wiper 4, which is in contact with the exterior surface of the sheet of glass, wipes the moisture from the same throughout the area thereof through which the operator of the machine views the condition of the road in advance of the automobile or airplane. As the edges of the plate 7 come in contact with the particles of ice which may form at the intermediate area of the pane of glass 8 the said edges cut the ice from the surface of the sheet of glass and the said edges plow or push the particles thus removed to one side or the other of the line of vision. At the same time the side of the cylinder 5 passes over the surface of the sheet of glass and prevents the edges of the plate from scratching the glass.

Having described the invention what is claimed is:—

In combination with an arm having a wiper attached thereto, a windshield cleaner attachment comprising a cylinder adapted to slip over the lower portion of the wiper and circumscribe the same, and a plate applied to the cylinder and having angularly disposed side portions with edges adapted to bear against the exterior surface of the windshield and flexible elements attached to the cylinder for tying the same to the arm.

In testimony whereof I affix my signature.

CLARENCE O. McCORD.